W. G. PFEIFFER.
MUD HOOK.
APPLICATION FILED DEC. 4, 1920.

1,395,868.

Patented Nov. 1, 1921.

Inventor:
William G. Pfeiffer,
By Hugh K. Wagner,
Att'y.

UNITED STATES PATENT OFFICE.

WILLIAM G. PFEIFFER, OF ST. LOUIS, MISSOURI.

MUD-HOOK.

1,395,868.  Specification of Letters Patent.  Patented Nov. 1, 1921.

Application filed December 4, 1920. Serial No. 428,259.

*To all whom it may concern:*

Be it known that I, WILLIAM G. PFEIFFER, a citizen of the United States, residing at the city of St. Louis, in the State of Missouri, have invented certain new and useful Improvements in Mud-Hooks, of which the following is a specification.

This invention is what is known as a mud-hook or spur for the wheels of motor-vehicles and is intended to assist them in obtaining traction in mud, in order to extricate them therefrom.

In the accompanying drawings forming part of this specification, in which like numbers of reference denote like parts wherever they occur, Figure 1 is a transverse sectional view taken through this device in place upon a motor-vehicle tire;

Figure 1:
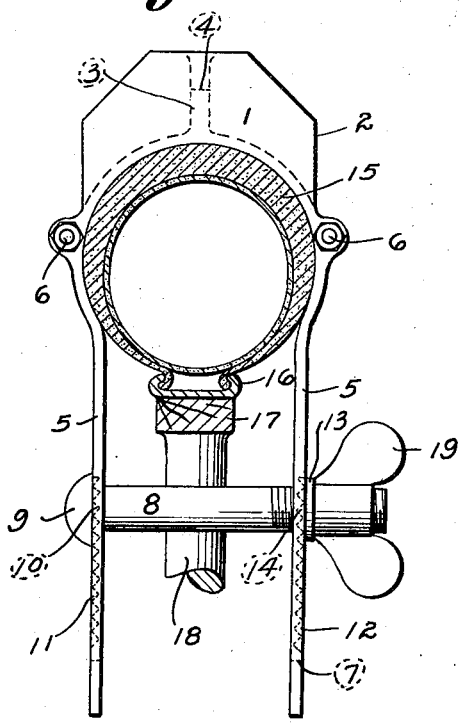
Figure 2:
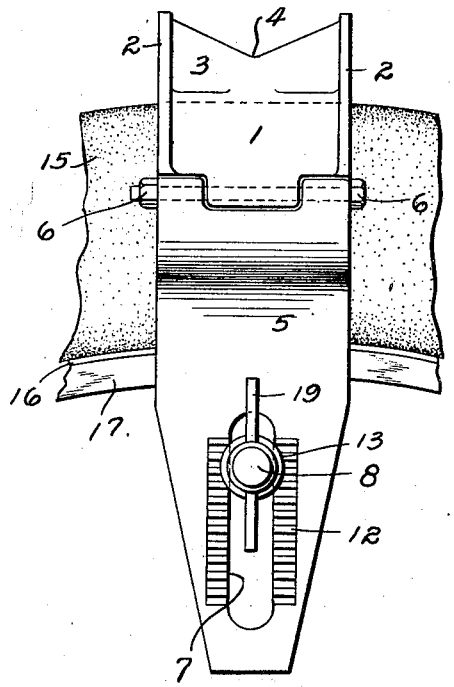
Fig. 2 is a side elevation of the same.
Figure 3:
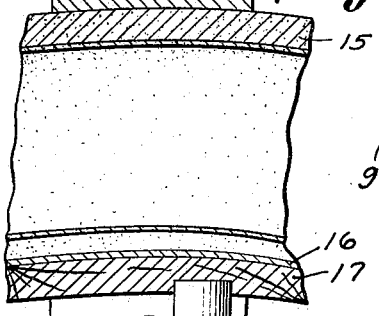
Fig. 3 is a sectional view taken substantially at a right angle to Fig. 1.
Figure 4:
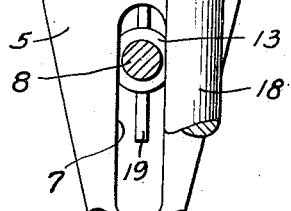
Fig. 4 is a detail of the tie-bolt.

The spur 1 is composed of a plurality of webs 2 united by a rib 3, which preferably slants downward from each web 2 toward a depression 4. This slant adds to the traction in either direction, because one part of it is in one direction and the other part in the opposite direction. Whether the car is moved backward or forward the outside of one web 2 is presented against the mud or other soft condition and, at the same time, the inside of the other web 2, plus the rising slant of rib 3.

Hangers 5 are pivoted at 6 to the spur 1, and are preferably formed of straps containing slots 7.

Bolt 8 passes through slots 7, being provided at one end with a head 9 having a pair of pointed lugs 10 or the like adapted to fit into the notches of rack 11 or rack 12 and at the other end with a washer 13 having similar pointed lugs 14 likewise adapted to seat in the notches of either rack 11 or 12.

When spur 1 has been placed on tire 15 attached to rim 16 borne by felly 17, the bolt 8 is run between a pair of spokes 18; washer 13 is placed on bolt 8; and winged nut 19 is screwed on bolt 8, thereby drawing hangers 5 together, and lugs 10 and 14 seating in the racks 11 and 12, the size of the device being thus adjustable to any size of tire and the bite of lugs 10 and 14 in racks 11 and 12 preventing slippage. They can bite high or low on the racks according to the size of the tire.

Having thus described this invention, I hereby reserve the benefit of all changes in form, arrangement, order, or use of parts, as it is evident that many minor changes may be made therein without departing from the spirit of this invention or the scope of the following claims.

I claim:

1. In a mudhook, the combination of a main body, attaching hangers, the said hangers being in the form of slotted straps, and a bolt adapted to pass through the said slots and to fasten the device, and the said hangers having thereon racks and the said bolt a tooth adapted to bite in one of the said racks.

2. In a mudhook, the combination of a main body, attaching hangers, the said hangers being in the form of slotted straps, and a bolt adapted to pass through the said slots and to fasten the device, and the said hangers having thereon racks and the said bolt a tooth adapted to bite in one of the said racks, and there being a washer mounted on the said bolt and provided with a tooth adapted to bite in the other of the said racks.

3. The combination in a device of the character described of a bolt having a head formed with a tooth on its inside, a washer formed with a tooth on its side facing the said head, a winged nut adapted to screw on the said bolt and to draw the said head in one direction and to force the said washer in the opposite direction, a pair of hangers adapted to be drawn toward each other by the said bolt by means of rotation of the said winged nut, a rack on each of the said hangers, the teeth on the said bolt head and washer being adapted to bite in opposite racks, a spur, and a pivotal connection between each of the said hangers and the said spur.

In testimony whereof I hereunto affix my signature.

WILLIAM G. PFEIFFER.